March 4, 1969　　F. J. SCHENKELBERGER　　3,430,974
VEHICLE STEERING APPARATUS
Filed Dec. 28, 1966

*INVENTOR*
FRANK J. SCHENKELBERGER
BY *J. C. Wiesler*
ATTORNEY

United States Patent Office 3,430,974
Patented Mar. 4, 1969

3,430,974
VEHICLE STEERING APPARATUS
Frank J. Schenkelberger, Battle Creek, Mich., assignor to Clark Equipment Company, a corporation of Michigan
Filed Dec. 28, 1966, Ser. No. 605,471
U.S. Cl. 280—93   7 Claims
Int. Cl. B62d 7/06

ABSTRACT OF THE DISCLOSURE

A steering apparatus embodying a pair of steering wheels, one of which may be positively disposed to a desired turn position, and at least the other of said steering wheels having a resilient tread portion and together with tracking means associated with such other wheel so that upon traction or movement of the vehicle the resilient tire tread in engagement with the ground or floor is deflected laterally effecting application of steering torque to the latter wheel to cause it to track in accordance with the turn of the steered wheel.

---

The present invention relates to steering apparatus primarily for vehicles of the industrial truck class embodying a pair of steering wheels, one of which wheels is controllable by the operator of the vehicle and the other of which wheels lines up or tracks automatically with the controlled steering wheel in turning the truck.

In conventional steering apparatus for an industrial truck, a pair of swivel mountings are supported on the frame of the truck for rotation about vertical axes and each swivel mounting supports a steering wheel for rotation about a horizontal axis. Operator controlled gearing is connected with one of such swivel mountings so that the operator may impart steering direction to the wheel and interconnecting linkage including a tie or connecting rod positively connects the swivels for uniform and conjoint rotation so that steering motion of the steered wheel is positively imparted to the other steering wheel. Such known arrangements are not entirely satisfactory in that in making a turn the steering wheels are not on the same radius line and the wheels will not perfectly track throughout the turn. Alternatively, it is known to provide a single controlled steering wheel and a caster wheel abreast of such steering wheel, and in which the caster wheel assumes uncontrolled positions to which it is disposed by forces imposed on it in the turning of the vehicle. Such a caster wheel must have its vertical mounting offset or in non-intersecting relation relative to the horizontal turning axis of the wheel so that the caster does not afford perfect tracking of the wheels of the vehicle.

According to the present invention, it is proposed to provide a steering apparatus embodying a pair of steering wheels, one of which may be positively disposed to a desired turn position, and at least the other of such steering wheels has a rubber tread portion and together with tracking means associated with such other steering wheel so that upon traction or movement of the vehicle the rubber tire tread in engagement with the ground or floor is deflected laterally effecting application of steering torque to the latter wheel to cause it to track in accordance with the turn of the steered wheel.

By reason of the present invention, the swivel mountings for the steering wheels may be mounted for rotation about parallel spaced apart vertical axes with the steering wheels lying on a common horizontal axis of rotation and in which the swivel axes are normal to the rotational axis of the wheels.

The above and other objects of the invention will appear from the following detailed description of a preferred embodiment of the invention as shown in the accompanying drawings and in which.

Figure 1:
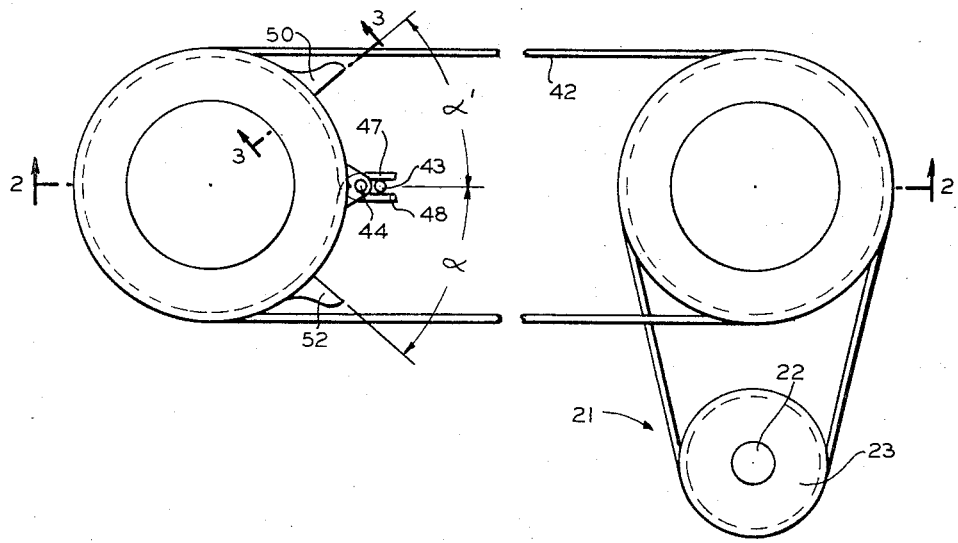
FIGURE 1 is a largely diagrammatic plan view of steering apparatus according to the present invention.

Referring now to the drawings, the steering apparatus of the present invention comprises a pair of steering assemblies indicated generally at 4 and 5 upon which a frame component 6 of the vehicle is supported.

Figure 2:
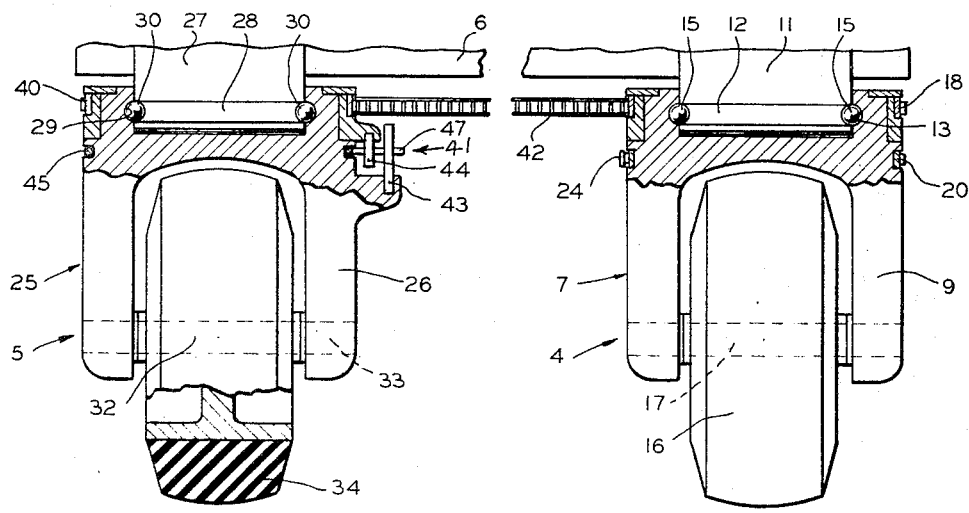
FIGURE 2 is a vertical sectional view taken along the line 2—2 on FIGURE 1 looking in the direction indicated by the arrows.
Figure 3:
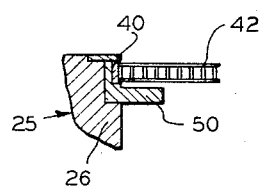
FIGURE 3 is a detail vertical sectional view taken substantially along the line 3—3 on FIGURE 1 looking in the direction indicated by the arrows.

The steering wheel assemblies 4 and 5 are of similar construction with the steering wheel assembly 4, as shown in FIGURE 2, comprising a first swivel mounting 7 defined by an inverted U-shaped bracket 9 journalled for rotation about a vertical axis on a depending axle stub shaft 11 fixed to the bottom of the frame component 6. Bearing races 12 and 13 are formed, respectively, in the stub shaft 11 and the upper end of swivel mounting 7 between which a plurality of ball bearings 15 are disposed to provide for rotational movement of swivel mounting 7. A first steering wheel 16 is supported for rotation on a horizontal axis about an axle pin 17 extending between and suitably secured at its opposite ends in the depending arms of the inverted U-shaped bracket 9. The steering wheel 16 is preferably provided with a tire having a rubber tread, but as will hereinafter appear, the tread of the wheel may be other than of rubber. A first sprocket wheel 18 is secured adjacent the upper end of the bracket 9, and a second sprocket wheel 20 is secured to the bracket 9 below the aforementioned upper sprocket wheel 18.

As diagrammatically illustrated in FIGURE 1, steering means 21 such as afforded by a steering column 22, rotatable in any conventional manner as by a hand wheel (not shown) is provided, and in which a sprocket wheel 23 is secured to the steering column 22. A chain, indicated at 24, extends between the sprocket wheel 23 of the steering means and the sprocket 20 of the bracket 9 so that upon rotation of the steering column 22 the swivel mounting 7 may be rotated in one direction or the other about its vertical rotational axis defined by axle stub shaft 11.

Again referring to FIGURE 2, the second steering wheel assembly 5 comprises a second swivel mounting 25 defined by an inverted U-shaped bracket 26 journalled for rotation about a vertical axis on the depending axle stub shaft 27 fixed to the bottom surface of the frame component 6 in laterally spaced relation abreast of the axle stub shaft 11 for the first swivel mounting 7. Bearing races 28 and 29 are formed, respectively, in the stub shaft 27 and the upper end of the bracket 26 between which ball bearings 30 are disposed for rotational movement of the second swivel mounting 25. A second steering wheel 32 is mounted for rotation on a horizontal axis about axle pin 33 extending between and secured at its opposite ends to the depending arms of the inverted U-shaped bracket 26. The second steering wheel 32 is provided with a rubber tread 34 which may be that of conventional rubber tire mounted on a suitable rim. It will be understood that in referring to the tire tread 34 as being of rubber, that it may be of other known similar materials characterized by being capable of lateral displacement at the footprint of the tire for reasons to be hereinafter explained. The U-shaped bracket 26 of the second swivel 25 has a sprocket wheel 40 journalled for rotation thereon and connecting means, such as afforded by chain 42, connects the fixed sprocket wheel 18 of the first swivel 7 with the sprocket 40 of the second swivel 25 so that upon rotation of the first swivel uniform and conjoint rotation is imparted to sprocket 40.

As best seen in FIGURE 2, tracking means 41 comprises a pin 43 fixed to the bracket 26 and a depending pin 44 secured to the sprocket wheel 40. A torsion spring indicated at 45 is disposed in a groove circumferentially around the bracket 26 and opposite ends 47 and 48 of the torsion spring 45 lie at opposite sides of the upstanding and depending pins 43 and 44, respectively.

Referring now to FIGURES 1 and 2, it will be noted that tracking means 41 further comprises lost-motion connecting means defined by limiting means including stop members 50 and 52 disposed in angular fixed spaced apart relation on sprocket 40 in positions to provide upon predetermined rotation of the sprocket 40 to engage pin 43. The angular extent of rotation in opposite directions of sprocket 40 before engagement of stops 50 or 52 with pin 43 is indicated by the angles alpha and alpha'. The sprocket 40 is thus mounted for predetermined lost motion rotational movement relative to the swivel mounting 25 as determined by the stops 50 and 52. Upon rotation of sprocket 40 beyond such perdetermined lost motion rotational movement one or the other of the stops 50 or 52 engage pin 43 to impart positive turning torque to swivel mounting 25. In the straight ahead position of the steering wheels, the pins 43 and 44 lie on a common radial centerline as shown in FIGURE 1 so that the torsion spring 45 in such position of the parts is not loaded. In rotation of sprocket 40 in either direction from the aforementioned common radial centerline position of pins 43 and 44 the torsion spring will be loaded until one of the stops 50 and 52 engage pin 43 after which the swivel mounting will rotate about its axis with the sprocket 40 as dictated by drive imparted through chain 42 by turning of the first swivel 7.

In the arrangement of steering apparatus as above described, manual manipulation of the steering means 21 to rotate the steering column 22 effects rotation of first swivel mounting 7 through sprockets 20 and 23 and chain 24. Rotation of swivel mounting 7 effects rotation of sprocket 18 and through the chain 42 uniform and conjoint rotation of sprocket wheel 40 journalled on second swivel mounting 25. When the vehicle is stationary and steering motion is imprated to the steering column, the sprocket 40 through the afore-described tracking means has predetermined lost motion rotational movement as defined by the stop 50 and 52. In such movement, the torsion spring 45 is loaded in a direction tending to turn the swivel 25 in the direction in which the swivel 7 has been turned. Upon movement being imparted to the vehicle in which the steering apparatus is mounted, and with the torsion spring loaded in accordance with the direction of turn imparted to steering wheel 16, the tread 34 of the tire at its foot print is laterally deflected by the lateral force component in the turning movement of the vehicle, so that as the wheel 32 revolves, steering torque is created for wheel 32 in that the laterally displaced rubber at the tire footprint is replaced by uneffected rubber rolling into contact with the surface and causing the reaction of forces in the tire at the tire print to become unsymmetrical about the lateral center line of the tire footprint and thus impart turning torque to the wheel 32. Thus, the wheel 32 tracks or follows the course that coincides with the curve dictated by the steering geometry of turn imparted to the steered wheel 16.

Assuming again that the vehicle in which the steering apparatus is mounted, that the steering column 22 is turned to an extent to engage either the stop member 50 or 52 with the pin 43, the torsion spring 45 is again loaded and, in addition, the swivel 25 is rotated by the engagement of either stop 50 or 55 therewith depending upon the direction of turning of the steering column 22. Again, in this instance the tire tread at the footprint portion thereof is laterally displaced or loaded and again upon turning movement of the vehicle as caused by the position of wheel 16 the reactive forces in the tire tread 34 at the tire print applies steering torque to the steering wheel 32.

The aforementioned angles alpha and alpha' are equal and greater than the maximum differential in steer tire angles when steered throughout a full cramp turn but less than 90°. It will be understood that a single chain may be trained about the steering sprocket 23 and suitable sprocket means for the pair of swivels 7 and 25 to provide for steering of the vehicle. Also, the vehicle in which the steering apparatus is mounted may be self-propelled by a prime mover in known manner or, if desired, the steering wheels could be powered wheels for effecting drive for the vehicle.

While there has been shown and described preferred embodiments of the invention, it will be understood that various modifications and rearrangements may be made therein without departing from the spirit and scope of the invention.

The invention claimed is:

1. Steering apparatus for a vehicle comprising first and second swivel mountings mounted on said vehicle for rotation about vertical axes, a first steering wheel mounted in said first swivel mounting for rotation about a horizontal axis, a second steering wheel mounted in said second swivel mounting for rotation about a horizontal axis, said second steering wheel having a tire with a resilient tread, steering means connected with said first swivel mounting for rotating the latter about its axis, connecting means connecting said first swivel mounting with said second swivel mounting to rotate the latter conjointly with said first swivel mounting upon rotation of the latter by said steering means, and tracking means between said connecting means and said second swivel mounting and responsive to lateral deflection of the tread of said tire at the tire print thereof upon movement of said vehicle and turning of said first steering wheel to effect application of steering torque to said second steering wheel to cause it to track in accordance with the turn of said first steering wheel.

2. The steering apparatus of claim 1 characterized by said steering wheels lying on a common horizontal rotational axis, and in which said axes of said swivel mountings are normal to said common horizontal rotational axis of said steering wheels.

3. The steering apparatus of claim 2 in which said tracking means comprises lost motion connecting means between said connecting means and second swivel mounting to provide for predetermined relative lost motion rotational movement therebetween.

4. The steering apparatus of claim 3 in which said tracking means includes torsion spring means between said connecting means and second swivel mounting adapted to be placed under load by rotation of said first swivel mounting to dispose first steering wheel in a turning position for biasing said second steering wheel in a direction to track with said first steering wheel upon movement of said vehicle.

5. The steering apparatus of claim 3 in which said tracking means includes limiting means between said connecting means and said second swivel mounting to limit the extent of relative lost motion rotational movement therebetween.

6. The steering apparatus of claim 3 in which said tracking means includes limiting means between said connecting means and said second swivel mounting to provide for turning of said second steering wheel by said second swivel mounting upon rotation of said second swivel mounting in an amount beyond said predetermined relative lost motion rotational movement therebetween.

7. The steering apparatus of claim 1 characterized by said connecting means comprising a sprocket mounted for rotation on said second swivel mounting.

References Cited

UNITED STATES PATENTS

| | | | |
|---|---|---|---|
| 1,141,290 | 6/1915 | Weatherwax | 280—94 |
| 2,875,842 | 3/1959 | Morrell | 280—93 X |
| 3,068,019 | 12/1962 | Ulinski | 280—93 X |
| 3,086,791 | 4/1963 | Ulinski | 280—95 |
| 3,239,025 | 3/1966 | Schreck | 280—93 X |
| 3,284,094 | 11/1966 | Grace | 280—93 |

KENNETH H. BETTS, *Primary Examiner.*

U.S. Cl. X.R.

280—94